United States Patent
Mulroy et al.

(10) Patent No.: US 8,259,802 B2
(45) Date of Patent: Sep. 4, 2012

(54) REFERENCE PICTURES FOR INTER-FRAME DIFFERENTIAL VIDEO CODING

(75) Inventors: Patrick J Mulroy, Ipswich (GB); Michael E Nilsson, Ipswich (GB)

(73) Assignee: British Telecommunications public limited company, London (GB)

( * ) Notice: Subject to any disclaimer, the term of this patent is extended or adjusted under 35 U.S.C. 154(b) by 957 days.

(21) Appl. No.: 12/281,701

(22) PCT Filed: Feb. 27, 2007

(86) PCT No.: PCT/GB2007/000669
§ 371 (c)(1),
(2), (4) Date: Sep. 4, 2008

(87) PCT Pub. No.: WO2007/104919
PCT Pub. Date: Sep. 20, 2007

(65) Prior Publication Data
US 2009/0052531 A1    Feb. 26, 2009

(30) Foreign Application Priority Data
Mar. 15, 2006   (EP) ..................................... 06251368

(51) Int. Cl.
*H04N 7/36* (2006.01)
(52) U.S. Cl. ................................. 375/240.12
(58) Field of Classification Search ............. 375/240.12
See application file for complete search history.

(56) References Cited

U.S. PATENT DOCUMENTS
6,049,570 A * 4/2000 Fukunaga et al. ....... 375/240.12
(Continued)

FOREIGN PATENT DOCUMENTS
EP          0 763 944        3/1997
(Continued)

OTHER PUBLICATIONS

"Study on adaptive reference picture selection coding scheme for the NEWPRED-receiver-oriented mobile visual communication system", Kimata, H.; Tomita, Y.; Yamaguchi, H.; Ichinose, S.; Global Telecommunications Conference, 1998. GLOBECOM 98. The Bridge to Global Integration. IEEE vol. 3, p. 1431-1436 (1998).*

(Continued)

*Primary Examiner* — Kibrom T Hailu
*Assistant Examiner* — Benjamin Lamont
(74) *Attorney, Agent, or Firm* — Nixon & Vanderhye P.C.

(57) ABSTRACT

A video encoder using inter-frame differential coding has a store (3) for containing a plurality of reference pictures. For each incoming picture it chooses one (or more) of the stored reference pictures to use. Control means (10) select which locally decoded pictures are to be entered into, and removed from, so that the store always contains at least one relatively older picture that lies within a defined time window and at least one relatively younger picture that is more recent than the time window. When it receives an error message from a receiver, it switches the coder from its normal a state (in which it is allowed to choose any picture as predictor) into a state in which it is permitted to choose only a said relatively older picture for prediction. The beginning of the time window is preferably set according to the estimated (or observed) round trip time between the encoder and decoder such that at least one of the relatively older pictures always predated the error message.

12 Claims, 4 Drawing Sheets

U.S. PATENT DOCUMENTS

| | | | |
|---|---|---|---|
| 6,169,821 B1 * | 1/2001 | Fukunaga et al. | 382/239 |
| 2006/0083298 A1 * | 4/2006 | Wang et al. | 375/240.01 |
| 2006/0188025 A1 * | 8/2006 | Hannuksela | 375/240.27 |

FOREIGN PATENT DOCUMENTS

| | | |
|---|---|---|
| EP | 0 763 944 A2 | 3/1997 |

OTHER PUBLICATIONS

Tomita et al. "Error Resilient Modified Inter-Frame Coding System for Limited Reference Picture Memories", Sep. 10, 1997. pp. 743-748, XP002347340.

Thomas Wiegand et al. "Long-Term Memory Motion-Compensated Prediction" IEEE, vol. 9, No. 1, Feb. 1999, XP011014548 pp. 70-84.

Thomas Wiegand et al. "Error-Resilient Video Transmission Using Long-Term Memory Motion-Compensated Prediction" IEEE, vol. 18, No. 6, Jun. 2000, XP011055153 pp. 1050-1062.

Liang, Y.L.; Flierl, M.; Girod, B.; "Low-latency video transmission over lossy packet networks using rate-distortion optimized reference picture selection," Proceedings 2002 International Conference on Image Processing, vol. 2, Sep. 22-25, 2002, pp. II-181-II-184.

Wenger, S., "H.264/AVC over IP," IEEE Transactions on Circuits and Systems for Video Technology, vol. 13, No. 7, Jul. 2003.

Wiegand, T., Sullivan, G.J., Bjontegaard, G., Luthra, A., "Overview of the H.264/AVC video coding standard," IEEE Transactions on Circuits and Systems for Video Technology, vol. 13, No. 7, Jul. 2003.

International Search Report for PCT/GB2007/000669, mailed May 18, 2007.

Thomas Wiegand et al. "Long-Term Memory Motion-Compensated Prediction" IEEE, vol. 9, No. 1, Feb. 1999, XP011014548 pp. 70-72.

Thomas Wiegand et al. "Error-Resilient Video Transmission Using Long-Term Memory Motion-Compensated Prediction" IEEE, vol. 18, No. 6, Jun. 2000, XP011055153 pp. 1050-1051.

* cited by examiner

REFERENCE PICTURES FOR INTER-FRAME DIFFERENTIAL VIDEO CODING

This application is the U.S. national phase of International Application No. PCT/GB2007/000669 filed 27 Feb. 2007 which designated the U.S. and claims priority to EP 06251368.4 filed 15 Mar. 2006, the entire contents of each of which are hereby incorporated by reference

BACKGROUND AND SUMMARY

The present invention concerns video coding, particularly in the context of video encoders employing inter-frame differential coding.

The present invention relates to methods for managing reference frames for inter-frame differential video coding. At least one picture is retained that is earlier than the current frame by a duration greater than or equal to the round trip time from the encoder to the decoder. Thus, when a packet loss situation occurs in the transmission between the encoder and the decoder, there is a strong probability that the encoder has available to it as a potential predictor a frame that the decoder has received correctly, rather than having to send an intra update.

BRIEF DESCRIPTION OF THE DRAWINGS

Some embodiments of the present invention will now be described, by way of example, with reference to the accompanying drawings, in which.

DETAILED DESCRIPTION OF PRESENT EXAMPLE EMBODIMENTS

Figure 1:
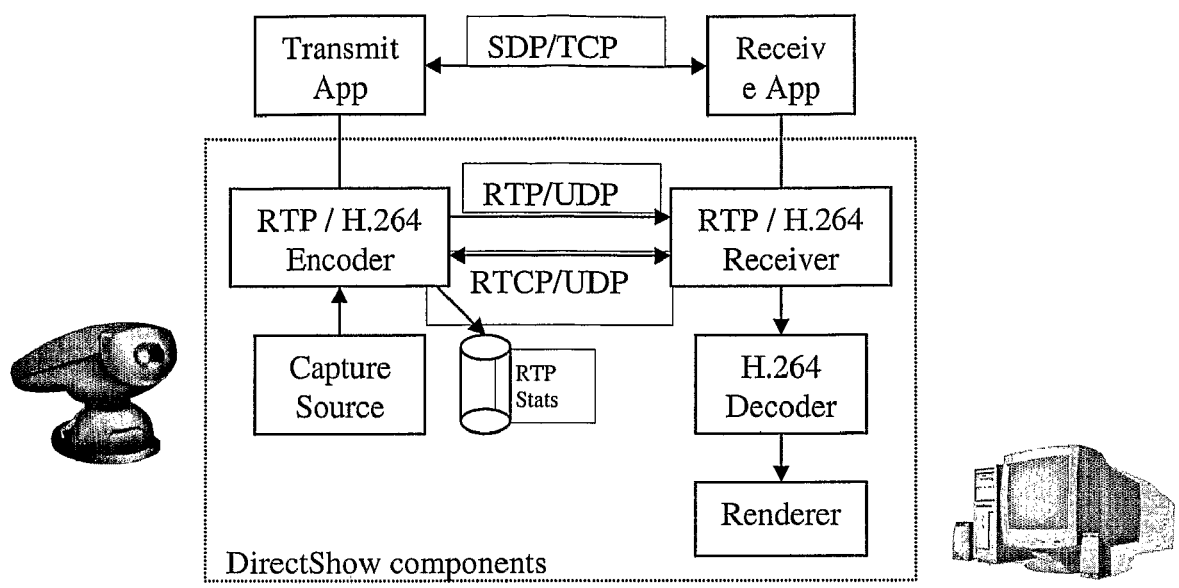
FIG. 1 is a block diagram of a video transmission system incorporating apparatus according to embodiments of the invention.

The general architecture of a real-time multi-reference H.264 encoder and decoder is illustrated in FIG. 1. The setup performs the following functions Video frame capture and H.264 real-time encode.
H.264 real-time decode and display.
H.264/RTP packetisation using RFC 3984.
Transmission over UDP/IP.
H.264/RTP de-packetisation.
RTCP/AVPF client thread (generation of RTP loss, jitter stats).
RTCP/AVPF server thread (polling for RTCP feedback).

The use of this particular coding standard and these particular transmission protocols are of course only examples and others may be chosen if desired. Note that RTCP provides regular reception reports (RRs) and the AVPF profile now allows immediate (or as immediate as feedback bandwidth limitation allows) feedback of packet loss errors.

Figure 2A:
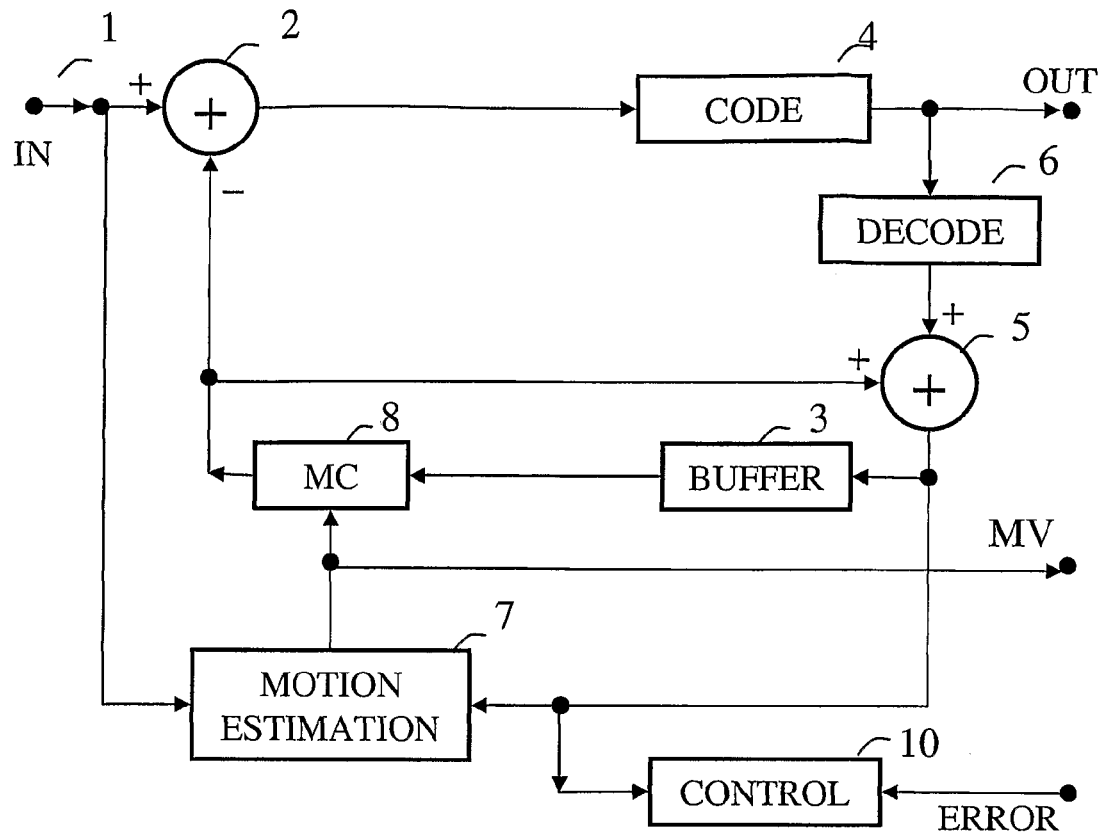
FIG. 2A is a block diagram of the coder of FIG. 1.

FIG. 2A shows the video encoder. Video signals (commonly in digital form) are received at an input 1. A subtractor 2 forms the difference between the input and a predicted signal from a predictor buffer 3 which is then further coded in box 4. The coding performed here is not material to the present invention, but may include thresholding (to suppress transmission of zero or minor differences) quantisation, transform coding and/or variable length coding, for example. The input to the predictor buffer 3 is the sum, formed in an adder 5, of the prediction and the coded difference signal decoded in a decoder 6 (so that loss of information in the coding and decoding process is included in the predictor loop). The decoder 6 and adder 5, along with the buffer 3 and motion compensation 8 form a local decoder.

Figure 2B:
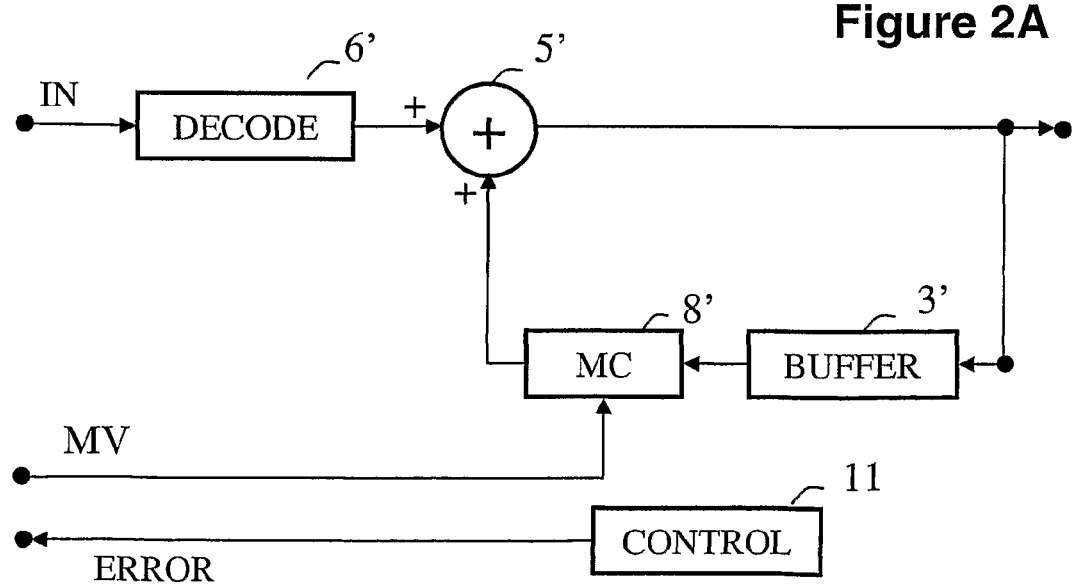
FIG. 2B is a block diagram of the decoder of FIG. 1.

FIG. 2B shows the decoder. Firstly, any of the coding operations performed in box 4 are reversed in box 6' (which is identical to box 6 of FIG. 1) to produce an inter-frame difference signal. This then added to a prediction from a frame store 3' after motion compensation in a motion compensation unit 8' which receives the motion vectors from the encoder. The output of the adder 5' forms the decoder output and is also fed to the input of the frame store 3'. Thus, the remote decoder of FIG. 2 has the same structure as the local decoder in FIG. 1, though, as will be seen later, some of the control functions may differ.

Although not shown, buffering may be provided, as is conventional, at the encoder output and decoder input to permit transmission over a constant bit-rate channel.

The differential coding is essentially inter-frame, though intra-frame coding may from time to time be used (either for a whole frame or for selected blocks of the frame) so as to limit the propagation of transmission errors. The prediction could simply consist of an earlier (or, in some systems, later) decoded frame from predictor buffer 3; as shown however a motion estimator 7 is also included. This compares the frame of the picture being coded with the frame from the buffer: for each block of the current frame (into which the picture is regarded as divided) it identifies that region of the previous frame which the block most closely resembles. The vector difference in position between the identified region and the block in question is termed a motion vector (since it usually represents motion of an object within the scene depicted by the television picture) and is applied to a motion compensation unit 8 which serves to shift the identified region of the previous frame into the position of the relevant block in the current frame, thereby producing a better prediction. This results in the differences formed by the subtractor 2 being, on average, smaller and permits the coder 4 to encode the picture using a lower bit rate than would otherwise be the case.

The predictor buffer 3, 3' is able to contain a number of frames—four, in this example. In principle the encoder can use any stored frame as a predictor, or, even, more than one: for example, H.264 and H.263 allow the reference frame to be selected on an 8×8 block basis.

Figure 3:
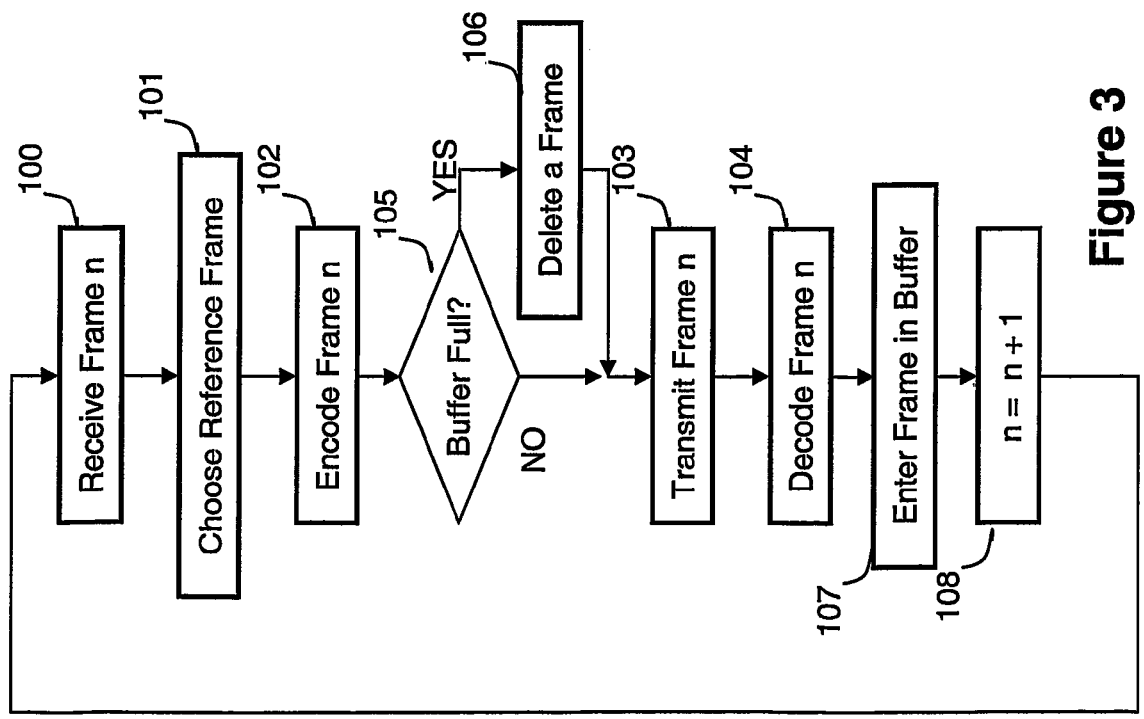

FIG. 3 shows the operation of the encoder. In Step 100, a frame—call this frame n—is received at the input. In step 101, for each 8×8 block, the encoder examines all candidate frames in the buffer 3 (or as many as it has time for) to determine which gives the best compression. Then in Step 102 the frame is encoded; and at 103, transmitted. It is also decoded at 104 by the local decoder 5, 6 etc. Naturally the transmitted information includes the reference indices of the predictor, or all the predictors, used so that the decoder can use the correct one(s) for decoding. The process of Steps 101-104 are known, and will not, therefore, be described in detail.

At 105, a control unit 10 determines whether there is space in the predictor buffer 3 to accommodate the newly-decoded frame, and if not it deletes at Step 106 one of the existing frames. The algorithm for deleting frames will be described presently. Then at Step 107 the newly-decoded frame is stored in the buffer 3 and the process is repeated for the next value of n.

In the case of an H.264 encoder, we prefer that the encoder stores all of its reference frames as "short term frames", as defined in the standard; long term reference frames could be used, but they were considered less resilient to loss of "memory management control operations" than short term frames.

Whenever, at Step 106, the encoder deletes a frame from the buffer 3, the transmission at Step 103 includes a message to the decoder instructing it to delete that frame too. In this example, such messages are sent using the "memory management control operations" defined in H.264. The decoder buffer follows the encoder buffer by acting on these memory management control operations that the encoder has put in the bitstream.

We prefer that these messages are sent in each slice (NAL unit) that is sent, so if, for example, a picture is encoded into four slices, these sets of "memory management control operations" (MMCO commands) are sent four times each. MMCO commands can be used to remove a short or long term picture from the buffer, map a short term to a long term, empty the buffer etc. Multiple MMCO commands can be sent in the same slice (NAL unit).

If the decoder loses a set of MMCO commands, there will be mismatch between the contents of the encoder and decoder buffers. To alleviate this, we propose a modified version in which every slice contains a message informing the decoder as to exactly which frames should be in the decoder buffer at that time. One way of doing this is to make use of the "reference picture list reordering" commands defined by H.264. The way these function is as follows. The encoder has a set of reference frames. It may choose to use one, some or all of these when encoding a frame. Conceptually, these frames are put in a default order, starting with the most recent (largest frame number, ignoring wrap issues, proceeding to the oldest short term frame, followed by the long term frames (if any) in order of increasing long term index. The encoder may optionally include in the bitstream a set of remapping instructions that alter this default order into some other order, known as the remapped order. In the standard, the main purpose of this order is to facilitate the use of entropy coding for identifying the reference frames to be used. Remapping instructions are defined as an explicit mapping from frame number to remapped index (using frame number prediction for efficiency). The encoder may also indicate how many references are to be used. The variable length codes used to refer to reference frames depend on the number of reference frames declared to be used (0 bits if only one, a single bit if 2, else a variable length code table); the length of codeword depends on the remapped index, with a short code (1 bit) for index 0 etc. Remapping is useful when the default order is not the best for entropy coding efficiency. These remapping instructions can be made use of in the present context for indicating to the decoder which frames (by their frame numbers) should be in its buffer.

The way we do this is for the encoder to insert remapping instructions in every slice (NAL unit) that reference all frames in its buffer (there is not necessarily any changing of the default order), and for the decoder to use these to determine which frame to remove from its buffer when it otherwise does not have the required knowledge—perhaps because there is no MMCO removal command because the encoder has fewer frames in its buffer, or because an MMCO removal command refers to a frame the decoder does not have.

Thus we see that these remapping instructions are used by error recovery means operable to receive further messages from a coder, the further messages specifying which pictures should be in the store, and arranged in the event that a decoded picture is to be stored and a deletion message has not been received, to select a picture to be deleted from the store by reference to one of the further messages. Alternatively, the decoder could be fitted with error recovery means operable in the event that a decoded picture is to be stored and a deletion message has not been received, to select a picture to be deleted from the store, using the same algorithm as used at the coder for selecting pictures to be deleted.

Figure 4:
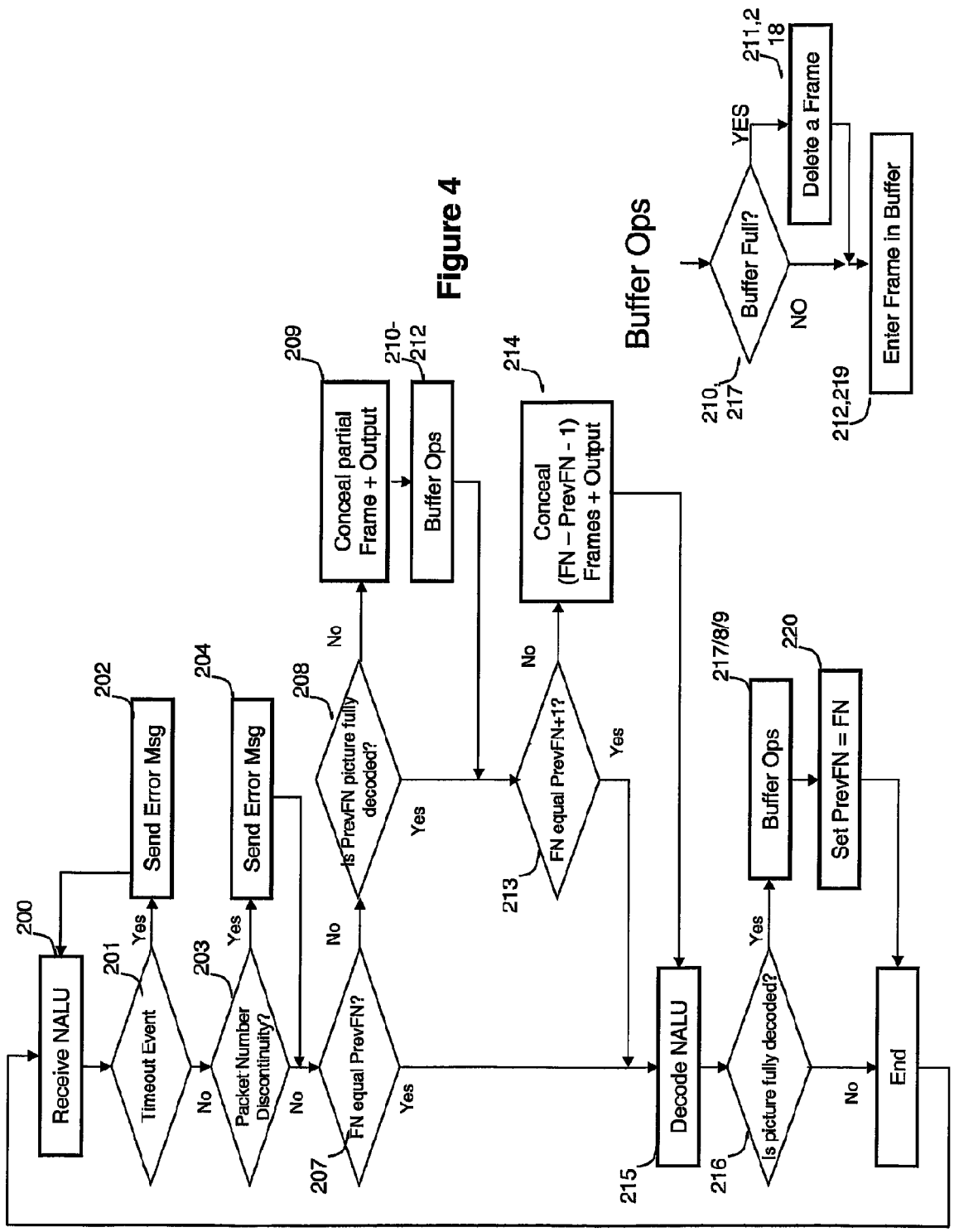

FIG. 4 shows the operation of the remote receiver. At Step 200 a slice is received. NALU is a Network Adaptation Layer Unit, suitable for encapsulation in a RTP packet. NALUs contain the coded H.264 slice data which may be data for an entire picture or a portion of a picture. In our implementation, we use the technique commonly known as Flexible Macroblock Ordering (FMO), where the macroblocks of a picture are divided into slice groups, and each of these slice groups is encoded into one or more slices. FN is the Frame number within the current slice header, PrevFN is the previous FN seen. In the event that a slice is not received (201) within a timeout period an error message is sent at Step 202 to the encoder. Then it is checked at step 203 that each packet is the one next expected and if not (i.e. the packet is missing) then at 204 an error message is transmitted back to the encoder. The function of the error messages at 202 and 204 is to identify the missing frame, or rather, in this example, the last good frame to have been received. This could be a frame number, but in this example we suppose that the data are transmitted using the RTP protocol and the error message sends the RTP packet number. In fact, in this example, Steps 200 to 204 are performed in the RTP receiver. At 207, the decoder checks whether the current slice is for the same frame as the preceding slice. If not, it is also checked (208) whether the preceding frame has been fully decoded. If not, (i.e. one or more slices are missing) then at 209 conventional concealment techniques are used to generate substitute slices for display (e.g. by copying pixels from a previous frame). Then, in Steps 210, 211 and 212 (which are the same as Steps 105,106 and 107 at the encoder), the concealed frame is inserted into the buffer, deleting an existing frame if necessary.

At 213, it is checked whether the frame being received is the next one after the previous frame. If not (i.e. there are one or more whole frames missing), appropriate concealment steps are taken to generate a substitute frame or frames for display. The number of frames substituted is FN-PrevFN-1. Note that here, the substitute frame(s) is/are not stored in the predictor buffer 3'.

The current slice is then decoded at Step 215. If errors are present, concealment techniques may, if desired, be used to alleviate them. If (Step 216) the frame is yet incomplete, the process returns to 200 for another slice. If it is complete, then, in Steps 217, 218 and 219 (which are the same as Steps 105,106 and 107 at the encoder), the newly decoded frame is inserted into the buffer, deleting an existing frame if necessary. The variable PrevFN pointing to the previous frame number is set to FN at Step 220.

It can occur that a frame is received without errors, but cannot be decoded correctly because its reference frame is absent from the buffer. This can be dealt with by decoding the NAL unit in box 215, using an alternative frame that is present in the decoder. Note that some macroblocks may be decoded correctly as their references are present and correct, while only some macroblocks may refer to the missing or corrupted references.

Alternatively, this condition could be recognised and cause control to be passed to Step 214, as in the case of the frame not being received.

Note that in some systems not all frames are used as predictors for coding of other frames: for example in the MPEG-2 standard, a B-frame, though coded using interframe differential coding techniques, is never itself used as a reference frame for the coding of another frame. In such circumstances, neither the encoder nor the decoder needs to store the decoded frame.

The error concealment techniques used may be any of those conventionally employed. For example the decoder may conceal the error by copying incorrect portions of the frame from the previous frame or by employing more sophisticated error concealment techniques (e.g. using encoder tools such as Flexible Macroblock Ordering (FMO)). FMO allows macroblocks to be encoded in a different order from raster scan order, which in turn means that if some data is lost in transmission, there may be surrounding data that is received correctly, and which can be used for concealment of the lost information.

Figure 5:
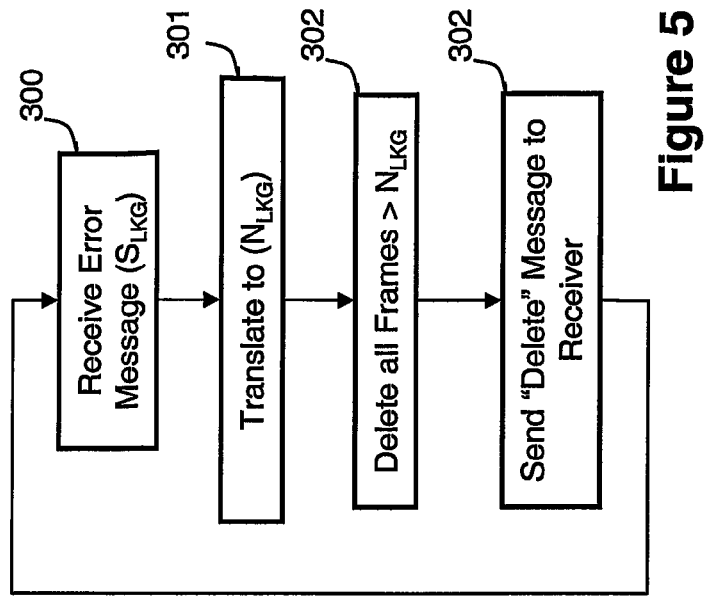
FIGS. 3, 4 and 5 are flowcharts showing the operation of the coder and decoder.

FIG. 5 is a flowchart showing the action taken by the control unit 10 at the encoder in response to receipt (at Step 300) of an error message from the remote decoder. In Step 301 it translates the RTP packet number in the message into the frame number $N_{LKG}$ of the corresponding last known good frame. Specifically, the RTCP AVPF transport feedback indication is sent identifying the RTP sequence number of the lost RTP payload. The RTP packetiser and RTCP handler at the encoder can deduce the latest reference to have been received correctly by storing a table of sequence numbers and frame numbers.

Then at Step 302, any frame that was transmitted after frame $N_{LKG}$ is (if present in the buffer 3) deleted from the buffer. The effect of this is that encoder is prevented from using this frame or frames—which are known not to have been reliably decoded by the remote decoder (or, at least, not known to have been reliably decoded)—as predictor for any further coded frames. At Step 303, an MMCO message is sent to the decoder so that the decoder can delete the corresponding frames from its own buffer (if they are actually present, of course). In an alternative implementation, the frame(s) that was/were transmitted after frame $N_{LKG}$ could, instead of being deleted from the buffer 3, simply be marked "do not use", in which case there would be no need to send the message to the decoder.

Note that if, as is usual, those frames which are to be used as predictors are coded and transmitted in capture-and-display order, then the frames to be deleted in response to an error message are those with frame numbers greater than or equal to $N_{LKG}$. In other casers, however the prediction pattern may be other than simply predicting frame n from frame n-1, for example in video redundancy coding each even numbered frame is predicted from the previous even-numbered frame, and similarly for the odd-numbered frames—i.e. frame n is predicted from frame n-1. In the general case, the frames to be deleted are those later-coded frames that use as predictor (directly or indirectly) the frame that was in error.

At this point we return to the issue of the routine removal of frames from the buffers to make way for new, incoming frames. The objective is to manage the buffer contents to facilitate the selection of references in the multiple reference framework described earlier and in particular the spreading of references over time, for both coding efficiency and error recovery purposes in a packet loss environment when a feedback channel is present. This can be particularly important in a high latency (>100 ms RTT) environment such as videotelephony (or low buffering video streaming) applications over ADSL or mobile networks using RTP/RTCP. We envisage that the buffer size is less than that which would be needed to accommodate all frames transmitted during the round-trip time—i.e. the buffer capacity is less than RTT divided by the data rate. The aim is to choose a combination of references that are close in time (e.g. frame n-1, frame n-2) and from certain defined older time periods the ranges of which are decided by the round trip time of the channel. As frames are coded these references can be managed so that there are always both very recent references for good compression efficiency and old references suitable for error recovery with high delay feedback.

In the present example, the two frames (n-1 and n-2) preceding the current frame n are always retained so that in a no packet loss situation multiple recent references are still available so compression efficiency should remain good. In addition, at least one frame that is earlier than the current frame by an amount greater than or equal to the round-trip time is retained, so that when in a packet loss situation the encoder receives an error message from the decoder there is a strong probability that the encoder has available to it as a potential predictor a frame that the decoder has received correctly, rather than having to send an intra update. This retention is however subject to an upper limit, and any frame older than this limit is discarded. In order to make it possible to maintain this condition in the steady state it is in general necessary to retain one or more frames that are intermediate in age between the most recent two and the one(s) older than the round-trip time. In this example, it is convenient to refer to the age of a frame: thus, if the current frame is frame n, then the age of frame j is n−j.

Essentially we define three windows—recent frames, intermediate frames, and old frames. In this example, the intermediate frames and old frames have a window size m, that is to say:

the "recent" first window is from age 1 to 2;
the "intermediate" window is from age 3 to age m+2
the "old" window is from age m+3 to 2m+2.

If m+3 is greater than or equal to the round trip time divided by the frame period, e.g. the smallest integer greater than or equal to the round trip time divided by the frame period, then a frame in the "old" window will always be older than the current frame by at least the round trip time.

The rules for the reference buffer management are:
1) Do not remove a frame unless the buffer is full
2) Always keep the two most recent frames, i.e. ages 1 and 2
3) Subject to the 2m+2 limit, always keep the oldest frame
4) Keep sufficient frames that when the oldest frame ages beyond the "old" window there is still a frame in this "old" window. This implies that a frame shall not be removed from the buffer if the time difference between the next oldest frame in the buffer and the next youngest frame in the buffer exceeds the size of the "old" window (i.e. m). Where, as here, the intermediate and "old" windows are the same size, this requires at least one frame always in the intermediate window.

The ideal scenario is to end up with the references spread in time in a steady state configuration. One way to ensure this is by working back from the oldest frame and keeping the remaining references evenly spread. (Oldest−m), (oldest−2m) etc. or closest if these are not available.

So working through an example with a buffer capacity of four frames, and m=3, the ranges are 1,2, [3 to 5], [6 to 8]

The progress of the contents of the buffer starting from empty, is as follows, where each number represents the age of a frame in the buffer and the retention criterion is to retain that frame whose age is closest to $n_{MAX}$−m, where $n_{MAX}$ is the age of the oldest frame in the buffer and m is, as before, the length of the "old" window.

1
1,2
1,2,3

1,2,3,4
1,2,3,4,5 possible (closest to 5-m in range [3 to 5] is 3)=>keep 1,2,3,5
1,2,3,4,6 possible (closest to 6-m is 3)=>keep 1,2,3,6
1,2,3,4,7 possible (closest to 7-m is 4)=>keep 1,2,4,7
1,2,3,5,8 possible (closest to 8-m is 5)=>keep 1,2,5,8
1,2,3,6,9 possible (9 out of range)=>1,2,3,6 back to steady state.

This particular algorithm also works with m=5 case (1,2,3,8 is the steady state here) and any value of m with the ranges the same length and non-overlapping.

Another problem that can arise is that the feedback packet (that sent at Step 202 or 204) itself gets lost. The decoder could be configured so that, following its sending an error message, then it detects if frames which should show evidence of remedial action taken at the encoder (i.e. those arriving at (time of feedback+RTT)) did not. It would expect to see MMCO commands removing the recent frames, or remapping instructions (if used) to move them to the end of the list, or off the list completely. Conversely, it Would not expect to receive frames predicted using as reference frames frames which should have been deleted. Its response to non-appearance of these commands, or the use of incorrect references, would be to send another error message. If ranges were related directly to RTT in this case then one could have more than one attempt to recover with number of attempts equal to number of ranges.

If the encoder had a third (or more) window of older frames, then it could still recover on receiving the repeated feedback message, and even if that came too late, it could intra code a frame and clear its buffer.

Notice that in the decoder operation shown in FIG. 4, error messages back to the receiver are generated only at the RTP level, in response to packet loss. If desired, however, errors recognised during the decoding process of Step 215 could also be used to trigger an error message.

In the above description, it has been explained that a desirable objective is to ensure that the buffers always contain a frame that is older than the current frame by a margin that is greater than or equal to the round trip time. The worked example suggested that m+3 could be set equal to the smallest integer greater than or equal to the round trip time divided by the frame period.

There are a number of ways of achieving this in practice. The encoder can be configured manually for the expected RTT of the channel that is to be or used. Note the range approach above means that the age of the oldest reference will vary in the range [m+3 ... 2m+2] so the RTT should be less than m+3 frame periods; if however (for example because m has been set too low, or because the RTT changes unexpectedly), there is a probability—but no guarantee—that the RTTs up to 2m+2 frame periods may be accommodated. In the event that a wanted frame is absent, either for this reason or because of multiple errors, the encoder can recover by coding an intra frame and emptying the buffer of all earlier frames.

Alternatively, in a more sophisticated approach, the actual RTT can be measured, for example by processing RTCP Receiver Reports, and used to modify the spreading parameters above.

The decoder should be able to determine which frames it has decoded correctly and which it has not been able to decode correctly by examination of the RTP Sequence Numbers in the packets of data that it has received. However, it is possible that may not operate perfectly at all times: for example, a decoder may consider a reference frame to be correct, while the encoder has used a different reference frame that the decoder has not received at all. As one aim of these measures is to avoid the need for intra refresh frames, such undetected mismatch could persist in the decoded pictures indefinitely. To avoid the possibility of this, the coder and decoder could if desired be fitted with error detection arrangements such as those described in assignee's co-pending European patent application 05253512.7 dated 8 Jun. 2005.

By way of example, using the system described above with a feedback mechanism that can indicate loss at the decoder as soon as it occurs (using RTP/AVPF) a 5 reference 25 fps H.264 stream using 4 reference frame windows with m=5-ages {[1-2], [3-7], [8-12], [13-17]}, could accommodate feedback arriving with a channel RTT of up to 480 ms.

To achieve the same protection without this scheme an encoder would have to code using a sliding window of 12 short term reference frames. The time required to search through 12 references on a real time encoder is prohibitive and such a large number of references may not even be allowed depending on the profile and level capabilities of the encoder and decoder.

Some typical RTT latencies for various networks are quoted below:
GSM RTT time reported 920 ms
GPRS generally has latencies of 6-700 ms
EDGE/UMTS better but latencies of 2-500 ms
ADSL (single link ~40 ms)

Thus, the arrangements described can extend the reference history window for the prior art for the same complexity or significantly reduce the complexity for the same RTT window both for a small potential loss in coding efficiency in the case of no errors. Complexity reductions come from having a reduced subset of references for both multi-reference motion estimation and the binary tree modelling and storage requirements of the error modelling approaches quoted above.

Further information can be found here:
"H.264/AVC over IP", Wenger, S., IEEE Transactions on Circuits and Systems for Video Technology, vol. 13, no. 7 Jul. 2003.

"Overview of the H.264/AVC video coding standard", Wiegand, T., Sullivan, G. J., Bjontegaard, G., Luthra, A., IEEE Transactions on Circuits and Systems for Video Technology.

What is claimed is:

1. A method of transmitting video signals comprising:
   storing a plurality of reference pictures;
   coding input video signals, said input video signals representing a plurality of pictures, and transmitting them to a decoder, said coding being performed by, for at least some of the plurality of pictures, choosing one or more of the stored reference pictures and coding at least part of a current picture of the plurality of pictures using interframe differential coding relative thereto; and
   locally decoding the coded signals to generate locally decoded pictures for storage as said reference pictures;
   wherein the method further comprises receiving error messages and in response thereto suppressing the use of younger reference picture(s) as predictor and to choose only a said older reference picture for prediction;
   wherein said reference pictures are stored in a buffer having a storage capacity less than the round trip time to the decoder divided by the frame period; and
   wherein said method further comprises selecting a reference picture to be deleted from storage to make way for a newly-decoded picture, said selection being made in accordance with a defined time window having a duration of a plurality of frame periods and timed such that the youngest reference picture in the window is older than the current picture by a time interval of at least the round trip time divided by the frame period, according to the following rules:
(a) if there is only one reference picture falling within the defined window, that reference picture shall not be deleted; and
(b) no reference picture shall be deleted if the age difference between the reference pictures before and after it in the buffer exceeds the window length.

2. A method according to claim 1 in which the error messages contain an indication as to which reference picture was in error at the receiver and the method further comprises suppressing the use, as predictor, of the reference picture indicated to be in error and any subsequently coded picture predicted directly or indirectly from it.

3. A method according to claim 1 including measuring the round trip time and modifying the time window accordingly.

4. A method according to claim 1 including sending to a decoder a message identifying the reference picture selected to be deleted.

5. A video coder comprising:
a store for containing a plurality of reference pictures;
a differential coder for coding input video signals, said video signals comprising a plurality of pictures, being operable for each current picture of the plurality of pictures to choose one or more of the stored reference pictures and to code using inter-frame differential coding relative thereto;
a local decoder for generating locally decoded pictures for entry into the store;
a receiver for receiving error messages from a receiver and operable in response thereto to switch the coder from a state in which it is permitted to choose a younger reference picture as predictor into a state in which it is permitted to choose only a said older reference picture for prediction; and
a controller operable to select which locally decoded pictures are to be entered into, and removed from, the store, the controller being operable in accordance with a defined time window having a duration of a plurality of frame periods and timed such that the youngest reference picture in the window is older than the current picture by a time interval of at least the round trip time divided by the frame period, according to the following rules:
(a) if there is only one reference picture falling within the defined window, that reference picture shall not be deleted; and
(b) no reference picture shall be deleted if the age difference between the reference pictures before and after it in the buffer exceeds the window length;
the controller being further operable to receive measurements of round trip time and modify the time window accordingly.

6. A video coder according to claim 5 in which the error messages contain an indication as to which reference picture was in error at the receiver and the receiver for receiving error message is operable to suppress the use, as predictor, of the reference picture indicated to be in error and any subsequently coded picture predicted directly or indirectly from it.

7. A video coder according to claim 6 in which the controller is arranged, upon selection of the reference picture to be deleted, to send to the receiver a message identifying that reference picture.

8. A video system comprising:
a transmitter including a video coder according to claim 6;
a receiver able to transmit error messages to the transmitter; and
a measuring unit for measuring the round trip time between the transmitter and receiver and to communicate this measurement to the controller.

9. A video coder comprising:
a storage memory for storing data representing a plurality of reference pictures; and
a computer processing system having at least one computer processor and being configured to:
code input video signals, said video signals comprising data representing a plurality of pictures,
for each current picture of the plurality of pictures, choose one or more of the stored reference pictures and code using inter-frame differential coding relative thereto;
generate locally decoded pictures for entry of data into the storage memory;
receive error messages from a receiver, and in response thereto, switch coding from a state in which it is permitted to choose a younger reference picture as predictor into a state in which it is permitted to choose only a said older reference picture for prediction;
select data which locally decoded pictures are to be entered into, and removed from, the storage memory,
provide operation in accordance with a defined time window having a duration of a plurality of frame periods and timed such that the youngest reference picture in the window is older than the current picture by a time interval of at least the round trip time divided by the frame period, according to the following rules:
(a) if there is only one reference picture falling within the defined window, that reference picture shall not be deleted; and
(b) no reference picture shall be deleted if the age difference between the reference pictures before and after it in the buffer exceeds the window length; and
receive measurements of round trip time and modify the time window accordingly.

10. A video coder according to claim 9 wherein:
the error messages contain an indication as to which reference picture was in error at the receiver; and
the computer processing system is configured to suppress the use, as predictor, of the reference picture indicated to be in error and any subsequently coded picture predicted directly or indirectly from it.

11. A video coder according to claim 10 wherein the computer processing system is configured to, upon selection of the reference picture to be deleted, send to the receiver a message identifying that reference picture.

12. A video coder according to claim 9 wherein the computer processing system is configured to receive a communication indicating a measured round trip time of an transmitted and then received error message.

* * * * *